Patented Nov. 5, 1935

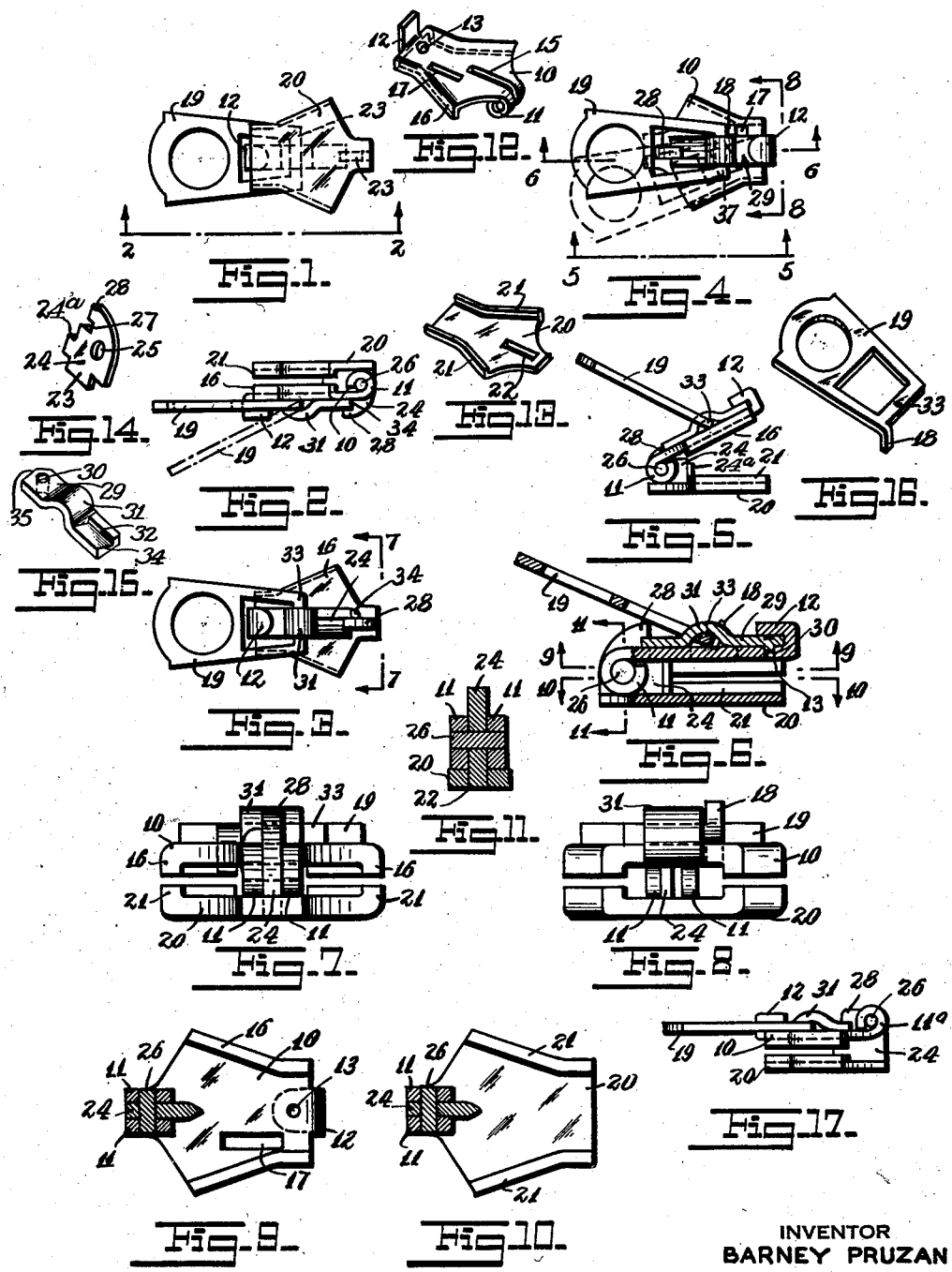

2,020,159

UNITED STATES PATENT OFFICE 2,020,159

SAFETY REMOVABLE FASTENER SLIDE

Barney Pruzan, Brooklyn, N. Y., assignor to Ranger Fastener Corporation, New York, N. Y.

Application March 26, 1934, Serial No. 717,375

18 Claims. (Cl. 24—205)

This invention relates to new and useful improvements in a safety removable fastener slide for a hook fastener.

The invention has for an object the construction of a fastener slide which is characterized by upper and lower trapezoidal guide plates, a post, a latch, and a handle in which the details of these parts constitute the invention and in which the construction is such as to operate in a novel fashion.

More particularly the invention has for an object the construction of the upper trapezoidal guide plate in such a manner as to be provided with a lug adapted to be bent over the end of the latch to hold a peg projecting from the latch in engagement in an aperture in the upper trapezoidal guide plate for pivotally holding the latch in proper operative condition.

Still further the invention also proposes an arrangement whereby bearing portions are formed upon the upper trapezoidal guide plate for pivotally connecting this guide plate with the post.

Still further the invention contemplates an arrangement whereby said bearing elements may be either directed upwards or downwards from the said upper trapezoidal guide plate.

Still further the invention also proposes an arrangement whereby the post is adapted to be riveted at its lower end upon the lower trapezoidal guide plate and wherein the post has a certain formation at the top constituting a hook for the latch and a stop for limiting pivotal separation of the trapezoidal guide plates.

Furthermore as another object of this invention it is proposed to arrange the latch with a depressed front end adapted to engage in snap relation with the hook on the post for holding the latch in its closed position.

Still further the invention proposes the construction of an article as mentioned which is simple and durable and which may be manufactured at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a bottom elevational view of a safety removable fastener slide constructed according to this invention.

Fig. 2 is an elevational view looking in the direction of the line 2—2 of Fig. 1.

Fig. 3 is a plan view of the safety removable fastener slide.

Fig. 4 is a view similar to Fig. 3 but showing the handle turned through 180° and showing the entire device turned around through 180°.

Fig. 5 is an edge elevational view as though looking in the direction of the line 5—5 of Fig. 4 but illustrating the device in its fully opened position.

Fig. 6 is a sectional view taken on the line 6—6 of Fig. 4.

Fig. 7 is an end elevational view looking in the direction of the line 7—7 of Fig. 3.

Fig. 8 is an end elevational view looking in the direction of the line 8—8 of Fig. 4.

Fig. 9 is a horizontal sectional view looking in the direction of the line 9—9 of Fig. 6.

Fig. 10 is a horizontal sectional view looking in the direction of the line 10—10 of Fig. 6.

Fig. 11 is a transverse vertical sectional view taken on the line 11—11 of Fig. 6.

Fig. 12 is a perspective view of the upper trapezoidal guide plate per se.

Fig. 13 is a perspective view of the lower trapezoidal guide plate per se.

Fig. 14 is a perspective view of the post per se.

Fig. 15 is a perspective view of the latch per se.

Fig. 16 is a perspective view of the handle per se.

Fig. 17 is a view similar to Fig. 2 but showing the fastener turned right side up and illustrating a modified form of the invention.

The safety removable fastener slide according to this invention comprises an upper trapezoidal guide plate 10 having bearing elements 11 formed at the large end and at the small end being formed with a lug 12 bendable over an adjacent opening 13. The bearing elements 11 are formed by turning portions of the material composing the guide plate down and around into tubular formation. A slot 15 is formed between the bearing elements 11. The edges 16 of the trapezoidal guide plate are turned downwards for the purpose of engaging over the hooks of the hook fastener. A small rectangular opening 17 is also formed in the upper guide plate 10 for the purpose of receiving a projection 18 upon a handle 19 for the device as hereinafter further described.

The device has a lower trapezoidal guide plate 20 having its sides 21 turned upwards for coaction with the down turned sides 16 of the upper trapezoidal guide plate. This lower trapezoidal guide plate is formed with an opening 22 into which the lower end 23 of a post 24 for the device is riveted. This post 24 has an opening 25 for a pin 26 adapted to engage through the bearing elements 11 for pivotally connecting the upper trapezoidal guide plate. The post 24 is provided with a lateral projection 24ª acting as a stop to limit downward pivoting of the upper trapezoidal guide plate. Furthermore the post 24 has a notch 27 producing a hook 28 which is adapted to coact with a latch element 29 as hereinafter further described.

The latch element 29 is a small strip of metal which has a peg 30 stamped out from one end. This peg 30 is adapted to engage into the opening 13 for the pivotal mounting of the latch element. The lug 12 is bent over the end of the latch element for preventing the disengagement of the peg 30 from the opening 13. The intermediate portion of the latch 29 is formed with a transverse upward bent portion 31 beneath which the rod portion 33 of the handle 19 passes. The front end of the latch 29 is formed with a longitudinal depressed portion 32 adapted to engage the lower side of the hook 28 in "snap" fashion.

In Figs. 1-3 inclusive the fastening slide is shown in the closed position in which position it is adapted to be moved forwards or rearwards for closing or opening conventional hook fasteners. The fastener slide may be opened for disengagement from the hooks of the fastener construction in the following manner: The handle 19 should be pivoted from the position illustrated in Fig. 3 to the position illustrated in Fig. 4. In the position illustrated in Fig. 3 the prong 18 of the handle engages into the opening 17 of the trapezoidal piece which prevents operation of the latch 29. In the pivoted position of the handle, that is, the position illustrated in Fig. 4 the prong 18 is now directed upwards out from the opening 17. The handle 19 may now be moved to cause the latch 29 to pivot free from the hook 28 which engages it. The latch 29 has a slight projection 34 at its free end which is adapted to engage the base of the slot 27 necessitating pivoting of the latch in one direction for disengaging the latch from the hook 28. It will be noticed that assuming the latch 29 illustrated in Fig. 15 to enter the notch 27 of the post shown in Fig. 14, then the latch cannot be pivoted anti-clockwise of the projection 34 and must necessarily be pivoted clockwise for the disengagement of the latch from the hook.

After the handle 19 is moved to disengage the latch 29 from the hook 28 then the trapezoidal guide plates may be pivoted open. The latch 29 may be pivoted through a small angle only just sufficient for the front end of it to clear the hook 28. The reason for this limited pivoting is the fact that the pivoted end of the latch is formed with a flat end 35 adapted to engage against the bend of the lug 12 limiting the pivoting of the latch through the small angle. In Fig. 4 the dot and dash lines illustrate the limited position of pivoting of the latch 29. The trapezoidal plates may now be pivoted open upon the pin 26 to the limited position illustrated in Fig. 5. The opening of the guide plates in this position is limited by the hook 28 striking the base of the slot 15. The opening of the guide plates to the position illustrated in Fig. 5 is just sufficient for the removal of the fastener slide from the hook fasteners.

The removable fastener slide may be reengaged by closing the upper and lower guide plates as limited by the stop surface 24ª of the post 24. In this position the upper and lower guide plates are substantially parallel. Next the handle 19 is moved to reengage the front end of the latch 29 beneath the hook 28. The latch will snap into locked position when the recess 32 engages beneath the hook 28. The hook 28 is of a width substantially equal to the width of the recess 32. Next the handle 19 should be pivoted through 180° to reengage the prong 18 into the opening 17. The slide is now latched in the closed position.

In Fig. 17 a modified form of the invention has been disclosed which distinguishes from the previous form merely in the construction of the bearing elements 11ª. These bearing elements distinguish from the bearing elements 11 merely in the fact that they are turned upwards of the upper trapezoidal guide plate distinguished from the prior construction in which they were turned downwards. In other respects this form of the invention is similar to the previous form and corresponding parts may be recognized by the same reference numerals.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new and desire to secure by United States Letters Patent is:—

1. A safety removable fastener, comprising an upper trapezoidal guide plate having its large end formed with bearing elements and the small end formed with an opening and a lug bendable over said opening, a lower trapezoidal guide plate associated with said upper trapezoidal guide plate, a post riveted on said lower trapezoidal guide plate and pivotally connected with said bearing elements holding said guide plates in superimposed positions and formed with a top hook for a latch element and for acting as a stop to limit hinging of the guide plates to an open position, a latch element having a peg at one end engaging said opening and held swivelly with said lug bent down engaging the top thereof, said latch element having an intermediate transverse arch for a transverse bar of a handle, and said latch element being engageable beneath said hook, and a handle with a transverse bar engaging beneath said arch.

2. A safety removable fastener, comprising an upper trapezoidal guide plate having its large end formed with bearing elements and the small end formed with an opening and a lug bendable over said opening, a lower trapezoidal guide plate associated with said upper trapezoidal guide plate, a post riveted on said lower trapezoidal guide plate and pivotally connected with said bearing elements holding said guide plates in superimposed positions and formed with a top hook for a latch element and for acting as a stop to limit hinging of the guide plates to an open position, a latch element having a peg at one end engaging said opening and held swivelly with said lug bent down engaging the top thereof, said latch element having an intermediate transverse arch for a transverse bar of a handle, and said latch element being engageable beneath said hook, and a handle with a transverse bar engaging beneath said arch, said bearing elements constituting portions of the guide plate bent around into tubular form.

3. A safety removable fastener, comprising an upper trapezoidal guide plate having its large end formed with bearing elements and the small end formed with an opening and a lug bendable over said opening, a lower trapezoidal guide plate associated with said upper trapezoidal guide plate, a post riveted on said lower trapezoidal guide plate and pivotally connected with said bearing elements holding said guide plates in superimposed positions and formed with a top hook for a latch element and for acting as a stop to limit hinging of the guide plates to an open position, a latch element having a peg at one end engaging said opening and held swivelly with said lug bent down engaging the top thereof, said latch element having an intermediate transverse arch for a transverse bar of a handle, and said latch element being engageable beneath said hook, and a handle with a transverse bar engaging beneath said arch, said bearing elements constituting portions of the guide plate bent around into tubular form, and a slot formed in said upper guide plate between said bearing elements and adapted to have its base engage said hook upon the post for limiting the opening of the upper guide plate relative to the lower guide plate.

4. A safety removable fastener, comprising an upper trapezoidal guide plate having its large end formed with bearing elements and the small end formed with an opening and a lug bendable over said opening, a lower trapezoidal guide plate associated with said upper trapezoidal guide plate, a post riveted on said lower trapezoidal guide plate and pivotally connected with said bearing elements holding said guide plates in superimposed positions and formed with a top hook for a latch element and for acting as a stop to limit hinging of the guide plates to an open position, a latch element having a peg at one end engaging said opening and held swivelly with said lug bent down engaging the top thereof, said latch element having an intermediate transverse arch for a transverse bar of a handle, and said latch element being engageable beneath said hook, and a handle with a transverse bar engaging beneath said arch, said post having a surface adapted to act as a stop for limiting closing of said guide plates relative to each other.

5. A safety removable fastener, comprising an upper trapezoidal guide plate having its large end formed with bearing elements and the small end formed with an opening and a lug bendable over said opening, a lower trapezoidal guide plate associated with said upper trapezoidal guide plate, a post riveted on said lower trapezoidal guide plate and pivotally connected with said bearing elements holding said guide plates in superimposed positions and formed with a top hook for a latch element and for acting as a stop to limit hinging of the guide plates to an open position, a latch element having a peg at one end engaging said opening and held swivelly with said lug bent down engaging the top thereof, said latch element having an intermediate transverse arch for a transverse bar of a handle, and said latch element being engageable beneath said hook, and a handle with a transverse bar engaging beneath said arch, a pin engaging through said bearing elements and said post for pivotally connecting the upper guide plate with the lower guide plate.

6. A safety removable fastener, comprising an upper trapezoidal guide plate having its large end formed with bearing elements and the small end formed with an opening and a lug bendable over said opening, a lower trapezoidal guide plate associated with said upper trapezoidal guide plate, a post riveted on said lower trapezoidal guide plate and pivotally connected with said bearing elements holding said guide plates in superimposed positions and formed with a top hook for a latch element and for acting as a stop to limit hinging of the guide plates to an open position, a latch element having a peg at one end engaging said opening and held swivelly with said lug bent down engaging the top thereof, said latch element having an intermediate transverse arch for a transverse bar of a handle, and said latch element being engageable beneath said hook, and a handle with a transverse bar engaging beneath said arch, said peg in the latch being formed by a portion of the metal stamped downwards from the material of the latch.

7. A safety removable fastener, comprising an upper trapezoidal guide plate having its large end formed with bearing elements and the small end formed with an opening and a lug bendable over said opening, a lower trapezoidal guide plate associated with said upper trapezoidal guide plate, a post riveted on said lower trapezoidal guide plate and pivotally connected with said bearing elements holding said guide plates in superimposed positions and formed with a top hook for a latch element and for acting as a stop to limit hinging of the guide plates to an open position, a latch element having a peg at one end engaging said opening and held swivelly with said lug bent down engaging the top thereof, said latch element having an intermediate transverse arch for a transverse bar of a handle, and said latch element being engageable beneath said hook, and a handle with a transverse bar engaging beneath said arch, the front end of the latch being formed with a longitudinal recess of a width corresponding with the width of said hook for snapping engagement by said hook.

8. A safety removable fastener, comprising an upper trapezoidal guide plate having its large end formed with bearing elements and the small end formed with an opening and a lug bendable over said opening, a lower trapezoidal guide plate associated with said upper trapezoidal guide plate, a post riveted on said lower trapezoidal guide plate and pivotally connected with said bearing elements holding said guide plates in superimposed positions and formed with a top hook for a latch element and for acting as a stop to limit hinging of the guide plates to an open position, a latch element having a peg at one end engaging said opening and held swivelly with said lug bent down engaging the top thereof, said latch element having an intermediate transverse arch for a transverse bar of a handle, and said latch element being engageable beneath said hook, and a handle with a transverse bar engaging beneath said arch, the front end of the latch being formed with a longitudinal recess of a width corresponding with the width of said hook for snapping engagement by said hook, and the front end of said latch being formed with a projection limiting pivoting of the latch in one direction for disengagement from the hook.

9. A safety removable fastener, comprising an upper trapezoidal guide plate having its large end formed with bearing elements and the small end formed with an opening and a lug bendable over said opening, a lower trapezoidal guide plate associated with said upper trapezoidal guide plate, a post riveted on said lower trapezoidal guide plate and pivotally connected with said bearing elements holding said guide plates in superimposed positions and formed with a top hook for a latch element and for acting as a stop to limit hinging of the guide plates to an open position, a latch element having a peg at one end engaging said opening and held swivelly with said lug bent down engaging the top thereof, said latch element having an intermediate transverse arch for a transverse bar of a handle, and said latch element being engageable beneath said hook, and a handle with a transverse bar engaging beneath said arch, the front end of the latch being formed with a longitudinal recess of a width corresponding with the width of said hook for snapping engagement by said hook, and the front end of said latch being formed with a projection limiting pivoting of the latch in one direction for disengagement from the hook, the rear end of the latch having portions adapted to engage the bend of said lug for limiting pivoting of the latch.

10. A safety removable fastener, comprising an upper trapezoidal guide plate having its large end formed with bearing elements and the small end formed with an opening and a lug bendable over said opening, the upper guide plate having a second opening a lower trapezoidal guide plate associated with said upper trapezoidal guide plate, a post riveted on said lower trapezoidal guide plate and pivotally connected with said bearing elements holding said guide plates in superimposed positions and formed with a top hook for a latch element and for acting as a stop to limit hinging of the guide plates to an open position, a latch element having a peg at one end engaging said opening and held swivelly with said lug bent down engaging the top thereof, said latch element having an intermediate transverse arch for a transverse bar of a handle, and said latch element being engageable beneath said hook, and a handle with a transverse bar engaging beneath said arch, and having a prong bent downwards and engaging in the second opening in said upper trapezoidal guide plate.

11. In a safety removable fastener, a pair of trapezoidal guide plates hingedly connected together, one of said plates being formed with an opening and a lug bendable over said opening, a latch element having a peg at one end received in said opening, and held swivelly with said lug bent down engaging the top thereof, and a hook on one of said plates projecting through the other plate and engageable by said latch element.

12. In a safety removable fastener, a pair of trapezoidal guide plates hingedly connected together, one of said plates being formed with an opening and a lug bendable over said opening, a latch element having a peg at one end received in said opening, and held swivelly with said lug bent down engaging the top thereof, and a hook on one of said plates projecting through the other plate and engageable by said latch element, said latch element having an intermediate transverse arch for a transverse bar of a handle, and a handle with a transverse bar engaging beneath said arch.

13. In a safety removable fastener, a pair of trapezoidal guide plates hingedly connected together, one of said plates being formed with an opening and a lug bendable over said opening, a latch element having a peg at one end received in said opening, and held swivelly with said lug bent down engaging the top thereof, a hook on one of said plates projecting through the other plate and engageable by said latch element, and a post mounted upon one of said plates at the hinged area thereof and projecting through the other of the plates, said hook being a projection on the end of said post which is formed into said hook.

14. In a safety removable fastener, a pair of trapezoidal guide plates hingedly connected together, one of said plates being formed with an opening and a lug bendable over said opening, a latch element having a peg at one end received in said opening, and held swivelly with said lug bent down engaging the top thereof, a hook on one of said plates projecting through the other plate and engageable by said latch element, and a post mounted upon one of said plates at the hinged area thereof and projecting through the other of the plates, said hook being a projection on the end of said post which is formed into said hook, said hook being engageable against a portion of one of said plates when the plates are pivoted apart for acting as a stop to limit pivoting of the plates to an open position.

15. In a safety removable fastener, a pair of trapezoidal guide plates hingedly connected together, one of said plates being formed with an opening and a lug bendable over said opening, a latch element having a peg at one end received in said opening, and held swivelly with said lug bent down engaging the top thereof, and a hook on one of said plates projecting through the other plate and engageable by a latch portion on said latch element, said latch portion being formed by a portion of the metal stamped downwards from the material of the latch element.

16. In a safety removable fastener, a pair of trapezoidal guide plates hingedly connected together, one of said plates being formed with an opening and a lug bendable over said opening, a latch element having a peg at one end received in said opening, and held swivelly with said lug bent down engaging the top thereof, and a hook on one of said plates projecting through the other plate and engageable by said latch element, the front end of the latch element being formed with a longitudinal recess of a width corresponding with the width of said hook for snap engagement, by said hook.

17. In a safety removable fastener, a pair of trapezoidal guide plates hingedly connected together, one of said plates being formed with an opening and a lug bendable over said opening, a latch element having a peg at one end and received in said opening, and held swivelly with said lug bent down engaging the top thereof, and a hook on one of said plates projecting through the other plate, and engageable by said latch element, the front end of the latch element being formed with a longitudinal recess of a width corresponding with the width of said hook for snap engagement by said hook and the front end of the latch being formed with a projection limiting pivoting of the latch in one direction for disengagement from the hook.

18. In a safety removable fastener, a pair of trapezoidal guide plates hingedly connected together, one of said plates being formed with an opening and a lug bendable over said opening, a latch element having a peg at one end received in said opening, and held swivelly with said lug bent down engaging the top thereof, and a hook on one of said plates projecting through the other plate and engageable by said latch element, and the rear end of the latch element having portions adapted to engage the bend of said lug for limiting pivoting of the latch.

BARNEY PRUZAN.